US009332506B2

(12) United States Patent
Wong et al.

(10) Patent No.: US 9,332,506 B2
(45) Date of Patent: May 3, 2016

(54) METHOD, APPARATUS AND COMPUTER PROGRAM FOR A MOBILE TRANSCEIVER AND FOR A BASE STATION TRANSCEIVER

(75) Inventors: Shin Horng Wong, Chippenham (GB); Matthew Baker, Canterbury (GB)

(73) Assignee: Alcatel Lucent, Boulogne-Billancourt (FR)

(*) Notice: Subject to any disclaimer, the term of this patent is extended or adjusted under 35 U.S.C. 154(b) by 153 days.

(21) Appl. No.: 14/237,732

(22) PCT Filed: Jul. 24, 2012

(86) PCT No.: PCT/EP2012/003126
§ 371 (c)(1),
(2), (4) Date: May 22, 2014

(87) PCT Pub. No.: WO2013/020654
PCT Pub. Date: Feb. 14, 2013

(65) Prior Publication Data
US 2014/0341123 A1    Nov. 20, 2014

(30) Foreign Application Priority Data

Aug. 10, 2011    (EP) .................................... 11306031

(51) Int. Cl.
*H04W 52/24*    (2009.01)
*H04L 5/00*    (2006.01)
*H04W 52/40*    (2009.01)

(52) U.S. Cl.
CPC ............ *H04W 52/243* (2013.01); *H04L 5/0073* (2013.01); *H04W 52/244* (2013.01); *H04W 52/245* (2013.01); *H04W 52/247* (2013.01); *H04W 52/40* (2013.01); *Y02B 60/50* (2013.01)

(58) Field of Classification Search
CPC ............ H04W 52/243; H04W 52/244; H04W 52/245; H04W 52/247; H04W 52/40; H04L 5/0073; Y02B 60/50
See application file for complete search history.

(56) References Cited

U.S. PATENT DOCUMENTS

| 8,325,621 | B2 * | 12/2012 | Simonsson | ........... H04W 52/40 370/252 |
| 2006/0209721 | A1 * | 9/2006 | Mese | ..................... H04W 28/24 370/254 |

(Continued)

FOREIGN PATENT DOCUMENTS

| WO | WO 2006/099547 A1 | 9/2006 |
| WO | WO 2009/097039 A1 | 8/2009 |
| WO | WO 2009/120478 A2 | 12/2009 |

OTHER PUBLICATIONS

International Search Report for PCT/EP2012/003126 dated Sep. 21, 2012.

(Continued)

*Primary Examiner* — Paul H Masur
(74) *Attorney, Agent, or Firm* — Fay Sharpe LLP (57) ABSTRACT

The following relates to a method, apparatus and computer program for a mobile transceiver 200 and a base station transceiver 300 of a cellular mobile communication network communicating with the mobile transceiver 200 using packet switched data, the mobile communication network comprising a plurality of base station transceivers 300, 301. A base station transceiver 300, 301 operating one or more cells 300a, 301a. The mobile station is associated with a first cell 300a. Interference reduction information is received from a second cell 301a, the interference reduction information comprising an indication on a request of the second cell 301a to reduce the transmission power of the mobile transceiver 200 to reduce the interference power received at the second cell 301a. A transmission power of the mobile transceiver 200 is reduced based on the interference reduction information from the second cell 301a and based on a reduction criterion.

15 Claims, 9 Drawing Sheets

(56) References Cited

U.S. PATENT DOCUMENTS

| | | |
|---|---|---|
| 2009/0305741 A1 | 12/2009 | Takeuchi et al. |
| 2010/0240387 A1* | 9/2010 | Ezaki ................ H04W 52/243 455/452.2 |
| 2011/0069631 A1* | 3/2011 | Eder .................... H04W 72/14 370/252 |
| 2012/0044875 A1* | 2/2012 | Kurtti .................. H04W 52/40 370/328 |
| 2012/0099444 A1* | 4/2012 | Hakola ............... H04W 52/242 370/248 |
| 2012/0220324 A1* | 8/2012 | Sambhwani ........ H04W 28/048 455/501 |
| 2012/0250521 A1* | 10/2012 | Marinier ............. H04W 72/082 370/241 |

OTHER PUBLICATIONS

Technical Specification 3rd Generation Partnership Project; Technical Specification Group Radio Access Network; Radio Resource Control (RRC); Protocol specification (Release 10), 3GPP TS 25.331 V10.4.0 (Jun. 2011), 1879 pages.

* cited by examiner

METHOD, APPARATUS AND COMPUTER PROGRAM FOR A MOBILE TRANSCEIVER AND FOR A BASE STATION TRANSCEIVER

This application is a U.S. national stage entry of International Application No. PCT/EP2012/003126, filed Jul. 24, 2012, which claims priority to European Application No.11306031.3, filed Aug. 10, 2011.

Embodiments of the present invention relate to mobile communications, more particularly to mobile communication networks using packet switched data transmission.

BACKGROUND

Demands for higher data rates for mobile services are steadily increasing. At the same time, modern mobile communication systems as 3rd Generation systems (3G) and 4th Generation systems (4G) provide enhanced technologies, which enable higher spectral efficiencies and allow for higher data rates and cell capacities.

In the Universal Mobile Telecommunication System (UMTS) radio resource management of User Equipment (UE) is mainly carried out by means of the Radio Resource Control (RRC) protocol, as specified by the 3rd Generation Partnership Project (3GPP) specifications, e.g. in 3GPP Technical Specification (TS) 25.331 V10.4.0 (2011-06). A mobile transceiver or UE that has an RRC connection can transmit and receive user traffic in CELL_DCH and CELL_FACH states. CELL_FACH state is usually for low and bursty traffic activity whilst CELL_DCH state is for high and often continuous traffic activity. CELL_DCH determines the state in which the UE has an active data connection to the network.

In CELL_DCH the UE has an active set consisting of cells that the UE can simultaneously communicate with, while utilizing circuit switched or uplink packet switched connections, which can also be referred to as dedicated connection. In other words, the UE is assigned permanent radio resources, as e.g. time, frequency and/or code resources, to transmit and receive data to and from each of the cells in the active set. That is, the UE can perform Soft HandOver (SHO) with these cells. SHO allows these cells to control the UE uplink transmission thereby controlling their uplink interference. SHO can increase the performance of uplink and downlink transmissions since it can benefit from diversity gains, as e.g. selective and soft combining.

In CELL_FACH, UEs in an overlapping coverage of two cells cause interference to their neighboring cells. While multiple cells can receive the uplink transmissions from a UE when in CELL_DCH using Soft HandOver (SHO), SHO is not possible in CELL_FACH. Hence, there is nothing the neighbor cell can do to reduce its interference. In the past, CELL_FACH was designed for short bursts of transmission and it acts as a temporary state, and hence a UE in the overlapping coverage would not cause prolonged interference.

SUMMARY

Embodiments are based on the finding that the assumption that there will be very few UEs in CELL_FACH and therefore the number of UEs in the overlapping region can be assumed to be small may not be valid. Embodiments are based on the finding that the bursty nature of smartphone traffic and the expectation that more smartphones will come into the market, will lead to more UEs staying in CELL_FACH longer, since CELL_FACH can handle smartphone traffic more efficiently than CELL_DCH. Therefore, the inter-cell interference in CELL_FACH will not be insignificant and a way to manage this interference in CELL_FACH would be useful.

Embodiments are based on the finding that it can be advantageous when a cell is allowed to send an inter-cell command to interfering mobile transceivers when these mobile transceivers are in a state like CELL_FACH, in which the uplink interference is not directly controllable. For example, such an inter-cell command can be transmitted in a broadcast manner. One example is the Relative Grant (RG) of the Enhanced-Dedicated CHannel (E-DCH) as it is part of the 3GPP specifications. It is a further finding that the E-DCH Relative Grant CHannel (E-RGCH) can be used to control the grants of its neighbor cells' UEs. According to another finding a UE can obtain, e.g. by decoding, information of this inter-cell E-RGCH of each of its neighbor cells, or cells that it can potentially interfere with, from information broadcast from its own serving cell. The inter-cell E-RGCH can be assumed to be broadcast to all inter-cell UEs.

Hence, when a cell faces high interference, it can broadcast an inter-cell E-RGCH. The neighbor cells' UEs within the overlapping region can reduce their grant and in doing so reduce their transmit power. This in effect can reduce the interference at the cell that broadcast the inter-cell E-RGCH. Moreover, it is a finding that a UE may only need to monitor E-RGCH from its neighbors if the difference in its serving and neighbor signals, e.g. from the Common PIlot Channel (CPICH) being within a threshold, indicating that the UE is close enough to the neighbor cell to cause harmful uplink interference.

It is a further finding that the inter-cell E-RGCH cannot target specific UE and hence, any UE that listen to this E-RGCH would reduce its grant. According to yet another finding this can cause excessive amount of grant reduction leading to degraded throughput performance. For example, it was found that if there are 20 UE in the overlapping region between two cells, a cell wishing to reduce its interference would broadcast this inter-cell E-RGCH. It is likely that only 1 UE needs to reduce its grant in order to reduce the uplink interference to an acceptable level. However, due to the broadcast nature, all 20 UEs that listen to this broadcast E-RGCH would reduce their grant leading to excessive throughput reduction for these UEs.

Embodiments are therefore based on the finding that a mobile transceiver being in an overlapping region between two cells, receiving interference reduction information from a cell the mobile transceiver generates interference in, may improve the system performance by not following the interference reduction information to its full extend. In embodiments this can be realized using different mechanisms, e.g. by not reducing the transmission power on every occurrence of the interference reduction information but only every second, third, fourth etc. time, or by reducing in smaller steps than what the neighbor cell actually desires, or by reducing only with a certain probability, etc. It is a finding that the number of UEs in the overlap region that obey the inter-cell E-RGCHs can be limited. In this way only some of the UEs would reduce their grants, thereby not causing a sharp degradation in cell edge throughput at the system level.

Embodiments provide an apparatus for a mobile transceiver in a cellular mobile communication network communicating with the mobile transceiver using packet switched data, i.e. embodiments may provide said apparatus to be operated by or included in a mobile transceiver. In the following, said apparatus will also be referred to as mobile transceiver apparatus. The terms cellular mobile communication network and mobile communication system will be used synonymously. The cellular mobile communication system may, for example, correspond to one of the 3GPP-standardized mobile communication networks, as e.g. Long Term Evolution (LTE), an LTE-Advanced (LTE-A), a Universal Mobile Telecommunication System (UMTS) or a UMTS Terrestrial Radio Access network (UTRAN), an Evolved-UTRAN (E-UTRAN), a Global System for Mobile Communication (GSM) or Enhanced Data Rates for GSM Evolution (EDGE) network, a GSM/EDGE Radio Access Network (GERAN), generally an Orthogonal Frequency Division Multiple Access (OFDMA) network, etc., or mobile communication networks with different standards, e.g. Worldwide Interoperability for Microwave Access (WIMAX).

In the following it is referred to packet switched transmission, as in CELL_FACH for UMTS, and as opposed to dedicated transmission, as in CELL_DCH in UMTS. For packet switched data transmission radio resources are not permanently assigned to a UE or mobile transceiver. For packet switched transmission radio resources are assigned to a UE only for transmission of a data block or packet, while for subsequent data blocks or packets other resources can be assigned. The resource assignment can depend on the respective channel condition of a UE and is sometimes also referred to as scheduling process. The radio resources are utilized and assigned to the mobile transceiver (UE) on a short time basis and per data block or data packet to which it may also be referred to as transport block. The scheduled packet data transmission is a bursty transmission, i.e. it is intermittently or interrupted by periods of suspended transmission during which the radio resources can be assigned to other UEs.

In embodiments the mobile communication network comprises a plurality of, i.e. two or more, base station transceivers and a base station transceiver operates one or more cells. The term cell refers to a coverage area of radio services provided by a base station transceiver. A base station transceiver may operate multiple cells, in some embodiments a cell may correspond to a sector. For example, sectors can be achieved using sector antennas, which provide a characteristic for covering an angular section around the base station transceiver. In some embodiments, a base station transceiver may, for example, operate three or six cells covering sectors of 120° (in case of three cells), 60° (in case of six cells) respectively. A mobile transceiver can be registered with a cell, i.e. it can be associated to a cell such that data can be exchanged between the network and the UE in the coverage area of the associated cell. A cell is thus operated by a base station transceiver and can be seen as a coverage area, which can be identified through reference or broadcast channels with a respective identification, as for example the Common PIlot CHannel (CPICH) in UMTS.

In embodiments the mobile transceiver apparatus comprises means for associating with a first cell, the first cell receiving packet switched data from the mobile transceiver, and means for determining a reduction criterion. Furthermore, the mobile transceiver apparatus comprises means for receiving interference reduction information from a second cell, the interference reduction information comprising an indication on a request of the second cell to reduce the transmission power of the mobile transceiver, to reduce the interference power received at the second cell. Moreover, the mobile transceiver apparatus comprises means for controlling a transmission power of the mobile transceiver based on the interference reduction information from the second cell and based on the reduction criterion, the means for controlling being adapted to reduce the transmission power of the mobile transceiver when the information on the interference reduction is received and the reduction criterion is fulfilled. The reduction criterion is such that the transmission power of the mobile transceiver is reduced by less than requested by the interference reduction information. In embodiments the reduction criterion can be such that the transmission power of the mobile transceiver is reduced by less than requested by the interference reduction information in a certain time period.

In embodiments, the mobile communication network can be a UMTS and the mobile transceiver can for example be in CELL_FACH and use an uplink channel, as e.g. the Random Access CHannel (RACH) or the Common-EDCH (C-EDCH), for packet switched transmission of uplink data to the first cell. While being in an overlapping region between the first and the second cell, the mobile transceiver can receive interference reduction information in terms of an E-RGCH from the second cell. In other words, the mobile transceiver may receive the E-RGCH as interference reduction information and then reduce its grant, which leads to a reduction of its transmit power. In some embodiments, the reduction of the transmit power can be indirect via the reduction of the grant of the mobile transceiver, which may also be referred to as serving grant. The grant of the mobile transceiver may then determine the maximum transmit power the mobile transceiver is allowed to transmit with. The mobile transceiver may transmit with its maximum transmit power (using up all the grant) when it has enough data for such transmission in its buffers. In some embodiments, the mobile transceiver may also reduce the size of the data packet or transport block for transmission when the transmit power is reduced, as the lower transmit power may not allow transmission of the data packet or transport block of the old size with sufficient quality anymore. In the following, when it is referred to transmit power reduction it may, equivalently, also be referred to reduction of the grant of the mobile transceiver.

In line with one finding, embodiments may use a reduction criterion such that the transmission power is reduced after reception of n subsequent requests, where n is an integer greater than one. In other words, the mobile transceiver may not reduce its transmission power on every reception of interference reception information, but only on every second, third, fourth, etc. reception. In this embodiment the transmission power of the mobile transceiver is reduced by less than requested by the interference reduction information also over a time period. Moreover, in further embodiments n can depend on a difference in the signal quality of a radio signal received from the first cell at the mobile transceiver and a radio signal received from the second cell at the mobile transceiver. The difference in the signal quality can be used as an indication on how severe the interference created by the respective mobile transceiver is at the second cell.

The reception quality of the radio signal of the second cell may be evaluated relative to the reception quality of the radio signal received at the mobile transceiver from the first cell, or vice versa. In embodiments such a relative evaluation can be carried out in terms of one of or a combination of a Signal-to-Noise Ratio (SNR), a Signal-to-Interference Ratio (SIR), a Signal-to-Interference-and-Noise Ratio (SINR), a pathloss, a received signal strength, etc. In some embodiments the reception quality of the radio signal of the second cell may be compared to the reception quality of the radio signal of the first cell, for example, the respective pathlosses may be compared.

As radio signals reference or pilot signals may be evaluated or measured, e.g. CPICHs in UMTS. For example, the reception powers of the CPICHs of the first and second cells may be compared at the mobile transceiver. As the transmission power of both cells can be known at the mobile transceiver (they can be read from broadcast information) the mobile transceiver can determine the pathlosses of the radio channels to the first and second cells. The mobile transceiver can then estimate the interference it creates for the second cell and whether it is critical or not. Moreover, the mobile transceiver, the means for controlling, respectively, can then adapt the reduction of its transmission power to the severity of the interference it creates for the second cell, the cell it received the interference reduction information from, respectively. For example, when the mobile transceiver determines that the cell which sent the interference reduction information would not experience significant interference from the mobile transceiver it can reduce its transmission power even less, e.g. choose a greater n, i.e. a longer reduction cycle, or a smaller reduction step etc. Thus in embodiments n can scale with the difference in the signal quality of a radio signal received from the first cell at the mobile transceiver and a radio signal received from the second cell at the mobile transceiver, i.e. n can be chosen greater, when the first cell is received a lot better than the second cell and vice versa. In other embodiments an absolute reception quality of the radio signal of the second cell can be evaluated, e.g. to determine a pathloss and an absolute measure for the interference power that will be caused for the second cell.

Moreover, embodiments may comprise a mechanism to avoid that all mobile transceivers reduce their transmission power at the same time. In the above described embodiment, the mobile transceiver may additionally apply an offset value, when it counts the n cycles of interference reduction information reception. The offset value may then be chosen differently for a group of mobile transceivers in the overlapping region between the first and second cells. Thus, not all of the mobile transceivers would reduce their transmission power at the same time. The reduction criterion can be such that an offset value $n_{off}$ is considered, which is an integer value and refers to the n cycles to be counted. In some embodiments $n_{off}$ can be based on an identification number of the mobile transceiver. The transmission power of the mobile transceiver can then be reduced when the sum of $n_{off}$ and the number of subsequent requests equals n or when ($n_{off}$+no. of subsequent requests) mod n=0. An interference reduction request may be comprised in the interference reduction information.

In further embodiments the reduction criterion can be such that the transmission power of the mobile transceiver is only reduced once in a predefined time period, e.g. only once in a number of radio frames. The reduction criterion can be such that the transmission power is reduced after reception of n subsequent requests, where n is an integer greater than one. As another option the transmission power can be reduced if prior interference reduction information from the second cell has been received more than a predefined time period ago. In other words, in some embodiments the means for controlling may carry out only one transmission power reduction in a predefined time period, e.g. a number of radio frames.

In yet another embodiment, the mobile transceiver apparatus further comprises means for determining a probability value and means for generating a random or a pseudo random value. The reduction criterion can then be such that the transmission power is reduced based on a relation between the probability value and the random or pseudo random value. For example, the means for generating the random or pseudo random variable generates a uniformly distributed number between 0 and 1. The means for determining can be adapted for receiving, or for being configured with, a probability value also between 0 and 1. The reduction criterion may then be fulfilled when the generated value is greater that the probability value. Thus, if the probability value is set to 0.5 the transmission power is statistically reduced every second time, i.e. upon reception of every second interference reduction information. In embodiments the means for determining can be adapted to receive the probability value from the first cell. The means for determining can be adapted to manipulate the probability value such that the transmission power is reduced more likely the longer the time since the last transmission power reduction. In other words, in some embodiments the probability value may be reduced if no transmission power reduction has been carried out for a certain time, thus, the longer the transmission power hasn't been reduced, the more likely a reduction becomes.

In other embodiments, the reduction criterion can be such that the transmission power is reduced by less than a requested reduction amount. In other words, the interference reduction information may include or be configured in relation to a certain transmission power reduction amount, e.g. 5 dB. The reduction criterion may then be such that the actual reduction of the transmission power upon reception of the interference reduction information is less than this amount, e.g. 3 dB. In other words, in embodiments the outcome is a reduction in transmission power. As it has already been described above, such a reduction may be achieved indirectly via a grant reduction, e.g. broadcast by E-RGCH.

In embodiments, the grant can basically be the amount of power the UE or mobile transceiver is allowed to transmit relative to its pilot or reference channel, e.g. the Downlink Physical Control CHannel (DPCCH) in UMTS.

The reduction of the transmission power may depend on a reception quality of a radio signal of the second cell received at the mobile transceiver or on a difference in the signal quality of a radio signal received from the first cell at the mobile transceiver and a radio signal received from the second cell at the mobile transceiver. In line with what is described above, the actual reduction amount can relate to the interference scenario, which can be determined using the corresponding measurements. If the mobile transceiver determines that the interference created at the second cell is critical then it may reduce the transmission power by a higher amount than in an interference situation, where the interference created at the second cell is less severe.

In further embodiments, the means for controlling the transmission power can be adapted to increase the transmission power of the mobile transceiver after a predefined time period has expired since the last transmission power reduction. In other words, after a transmission power reduction the means for controlling may reset or return the transmission power to the old level after a certain time period has expired.

Embodiments also provide a mobile transceiver comprising the mobile transceiver apparatus.

While the above description was mainly concerned with the mobile transceiver side, embodiments also provide the respective base station transceiver apparatus on the network side. Thus, embodiments provide an apparatus for a base station transceiver in a cellular mobile communication network communicating with a mobile transceiver, i.e. embodiments may provide said apparatus to be operated by or included in a base station transceiver. In the following, said apparatus will also be referred to as base station transceiver apparatus. The base station transceiver operates one or more cells and the mobile transceiver is associated to one of the one or more cells. The base station transceiver apparatus comprises means for generating a reduction criterion for the mobile transceiver. The mobile transceiver is adapted to control a transmission power of the mobile transceiver based on interference reduction information from a second cell and based on the reduction criterion. The transmission power of the mobile transceiver is reduced when the information on the interference reduction is received at the mobile transceiver and the reduction criterion is fulfilled. The reduction criterion is such that the transmission power of the mobile transceiver is reduced by less than requested by the interference reduction information from the second cell. The base station transceiver apparatus further comprises means for transmitting information on the reduction criterion to the mobile transceiver.

Embodiments further provide a base station transceiver comprising the base station transceiver apparatus. Hence, embodiments may also provide a system comprising the above mobile transceiver and/or the base station transceiver.

Embodiments further provide a method for a mobile transceiver in a cellular mobile communication network communicating with the mobile transceiver using packet switched data. The mobile communication network comprises a plurality of base station transceivers and a base station transceiver operates one or more cells. The method comprises a step of associating with a first cell, the first cell receiving packet switched data from the mobile transceiver and a step of determining a reduction criterion. The method comprises a further step of receiving interference reduction information from a second cell, the interference reduction information comprising an indication on a request of the second cell to reduce the transmission power of the mobile transceiver to reduce the interference power received at the second cell. The method further comprises controlling a transmission power of the mobile transceiver based on the interference reduction information from the second cell and based on a reduction criterion, the controlling being adapted to reduce the transmission power of the mobile transceiver when the information on the interference reduction is received and the reduction criterion is fulfilled, the reduction criterion being such that the transmission power of the mobile transceiver is reduced by less than requested by the interference reduction information.

Embodiments further provide a method for a base station transceiver in a cellular mobile communication network communicating with a mobile transceiver. The base station transceiver operates one or more cells and the mobile transceiver is associated to one of the one or more cells. The method comprises a step of generating a reduction criterion for the mobile transceiver, the mobile transceiver being adapted to control a transmission power of the mobile transceiver based on an interference reduction information from a second cell and based on the reduction criterion, the transmission power of the mobile transceiver being reduced when the information on the interference reduction is received at the mobile transceiver and the reduction criterion is fulfilled, the reduction criterion being such that the transmission power of the mobile transceiver is reduced by less than requested by the interference reduction information from the second cell. The method comprises a further step of transmitting information on the reduction criterion to the mobile transceiver.

Embodiments may provide a computer program having a program code for performing one of the above described methods, when the computer program is executed on a computer or processor.

Embodiments may allow a base station transceiver to manage its interference caused by its neighbor cells' mobile transceivers that are in CELL_FACH. Embodiments may enable a simple way to manage inter-cell interference without excessive reduction in throughput.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

Figure 1:
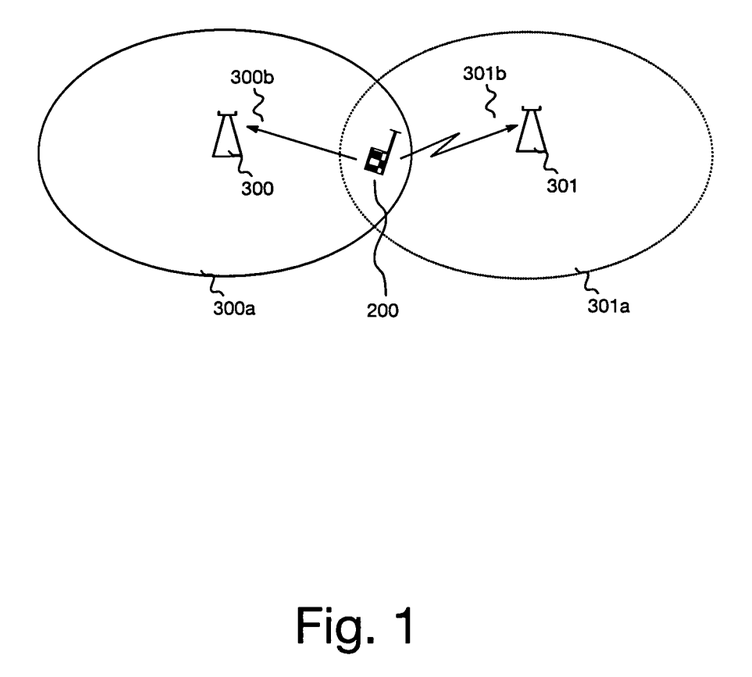
FIG. 1 illustrates a cellular mobile communication network with embodiments.

FIG. 1 illustrates a cellular communication network with a first base station transceiver 300 operating a first cell for which the coverage area is referenced by 300a. Moreover, the network comprises a second base station transceiver 301 operating a second cell for which the coverage area is referenced by 301a. Furthermore, FIG. 1 shows a mobile transceiver 200, which is located in a section of the network, where the coverage areas 300a and 301a of the first cell and second cell overlap. The arrow 300b indicates the data transmission of the mobile transceiver 200 to the first cell 300a. The arrow 301b indicates the interference created by the mobile transceiver 200 in the second cell 301a. In the following an embodiment will be described in which the mobile communication network is UMTS.

In FIG. 1 the UE 200 is attached to cell or NodeB (NB) 300a and it is located in the overlapping coverage area of the first NB 300a and the second NB 301a. The transmissions of this UE 200 will act as interference to the second NB 301a, 301b. The UE 200 is assumed to be in CELL_FACH and unlike CELL_DCH, there is no Soft Handover (SHO) in CELL_FACH.

Figure 2:
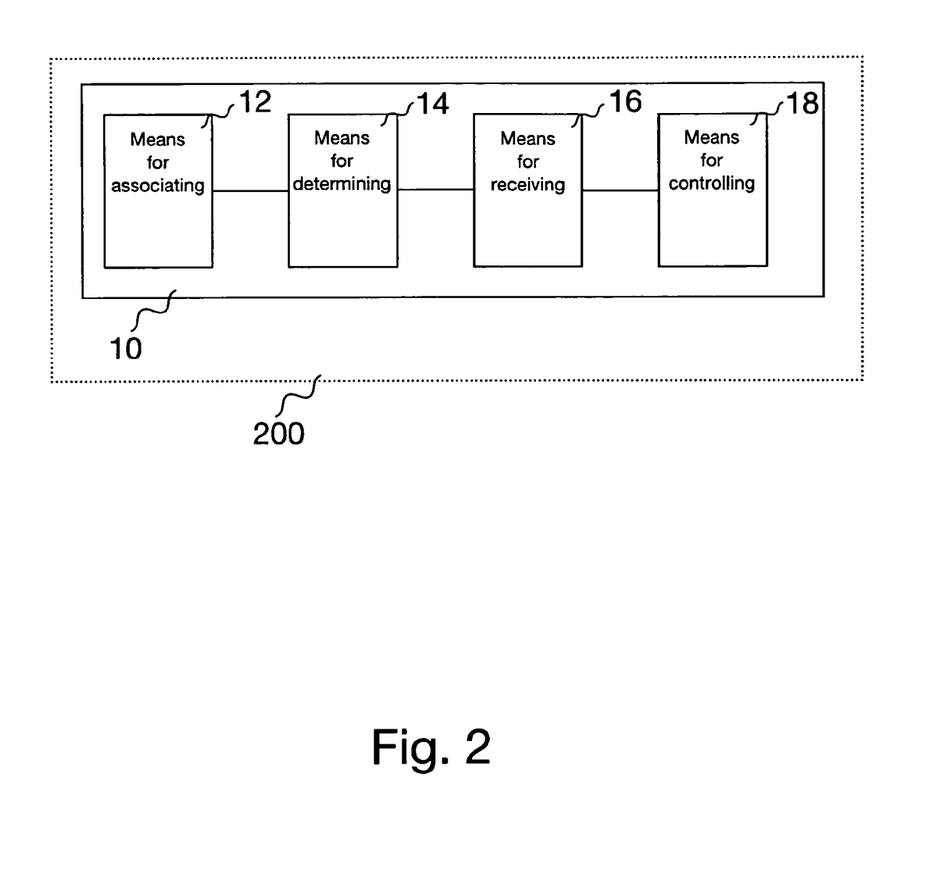
FIG. 2 shows an embodiment of an apparatus for a mobile transceiver.

FIG. 2 shows an embodiment of an apparatus 10 for the mobile transceiver 200 in the cellular mobile communication network illustrated by FIG. 1, which communicates with the mobile transceiver 200 using packet switched data. The apparatus 10 comprises means for associating 12 with the first cell 300a and the first cell 300a receiving packet switched data from the mobile transceiver 200, as indicated by arrow 300b in FIG. 1. The apparatus 10 comprises means for determining 14 the reduction criterion and means for receiving 16 interference reduction information from the second cell 301a. The interference reduction information comprises an indication on a request of the second cell 301a to reduce the transmission power of the mobile transceiver 200 to reduce the interference power received at the second cell 301a, indicated by arrow 301b in FIG. 1. The apparatus further comprises means for controlling 18 the transmission power of the mobile transceiver 200 based on the interference reduction information from the second cell 301a and based on the reduction criterion. The means for controlling 18 is adapted to reduce the transmission power of the mobile transceiver 200 when the information on the interference reduction is received and the reduction criterion is fulfilled, the reduction criterion being such that the transmission power of the mobile transceiver 200 is reduced by less than requested by the interference reduction information. FIG. 2 also illustrates the mobile station 200, which comprises the apparatus 10.

Figure 3:
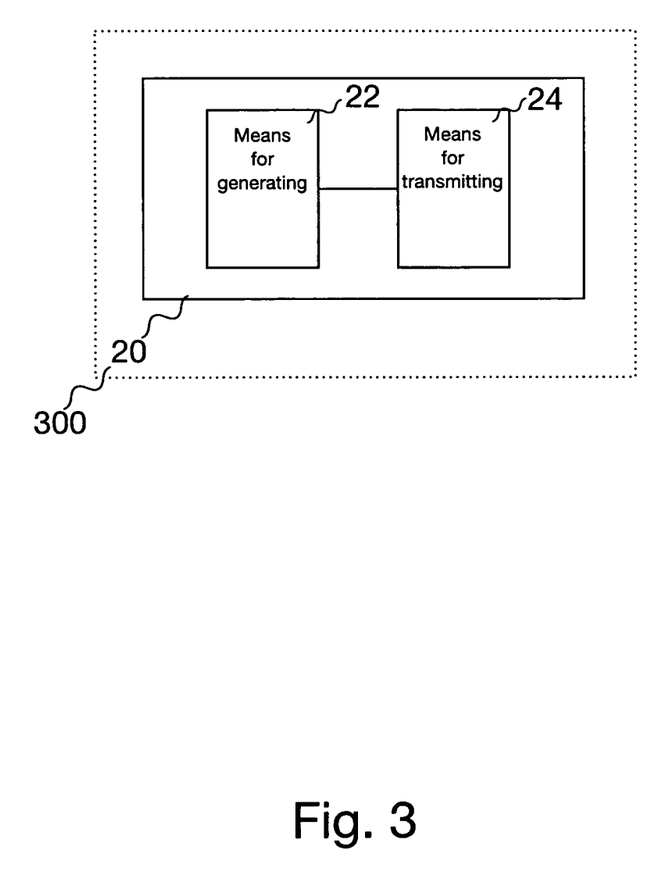
FIG. 3 shows an embodiment of an apparatus for a base station transceiver.

FIG. 3 illustrates an embodiment of an apparatus 20 for a base station transceiver 300 in a cellular mobile communication network communicating with a mobile transceiver 200. The apparatus 20 comprises means for generating 22 the reduction criterion for the mobile transceiver 200. The mobile transceiver 200 is adapted to control a transmission power of the mobile transceiver 200 based on interference reduction information from the second cell 301a and based on the reduction criterion, the transmission power of the mobile transceiver 200 being reduced when the information on the interference reduction is received at the mobile transceiver 200 and the reduction criterion is fulfilled, the reduction criterion being such that the transmission power of the mobile transceiver 200 is reduced by less than requested by the interference reduction information from the second cell 301a. The base station transceiver apparatus 20 further comprises means for transmitting 24 information on the reduction criterion to the mobile transceiver 200. FIG. 3 also illustrates the base station transceiver 300, which comprises the apparatus 20.

In the embodiment, an indirect transmission power reduction via a serving grant of the mobile transceivers can be assumed. E.g., the E-RGCH reduces the UE Serving Grant. Basically a UE using E-DCH is given grants to transmit at a specific level with reference to its DPCCH transmission power. For example, if the UE (after power control) requires to transmit its DPCCH at 2 dBm and the UE has a Serving Grant of 10 dB, that means the UE can transmit its E-DPDCH (i.e. the data part of E-DCH) at a max of 12 dBm. The Serving Grant can be a cumulative tab of the grants received from the NB. For example, if the UE has an initial Serving Grant of 10 dB, and it receives the following:

Time t1, +1 dB grant,
Time t2, +1 dB grant,
Time t3 −1 dB grant

The Serving Grant would look like this

Time t1=10 dB+1 dB=11 dB
Time t2=11 dB+1 dB=12 dB
Time t3=12 dB−1 dB=11 dB

So at time t3 the UE is allowed to transmit 11 dB+whatever DPCCH power for its E-DPDCH. If the UE does not have a large packet to transmit it need not use up all 11 dB worth of power. If the transport block requires only 3 dB worth of grant and the UE has 11 dB in its serving grant, it just needs to transmit 3 dB. Thus the UE may then reduce its transmission power even further, however, due to lack of data rather than due to interference reduction information. By reducing the UE's grant, the neighbor cell effectively reduces the (max) transmit power the UE is allowed to transmit.

Figure 4:
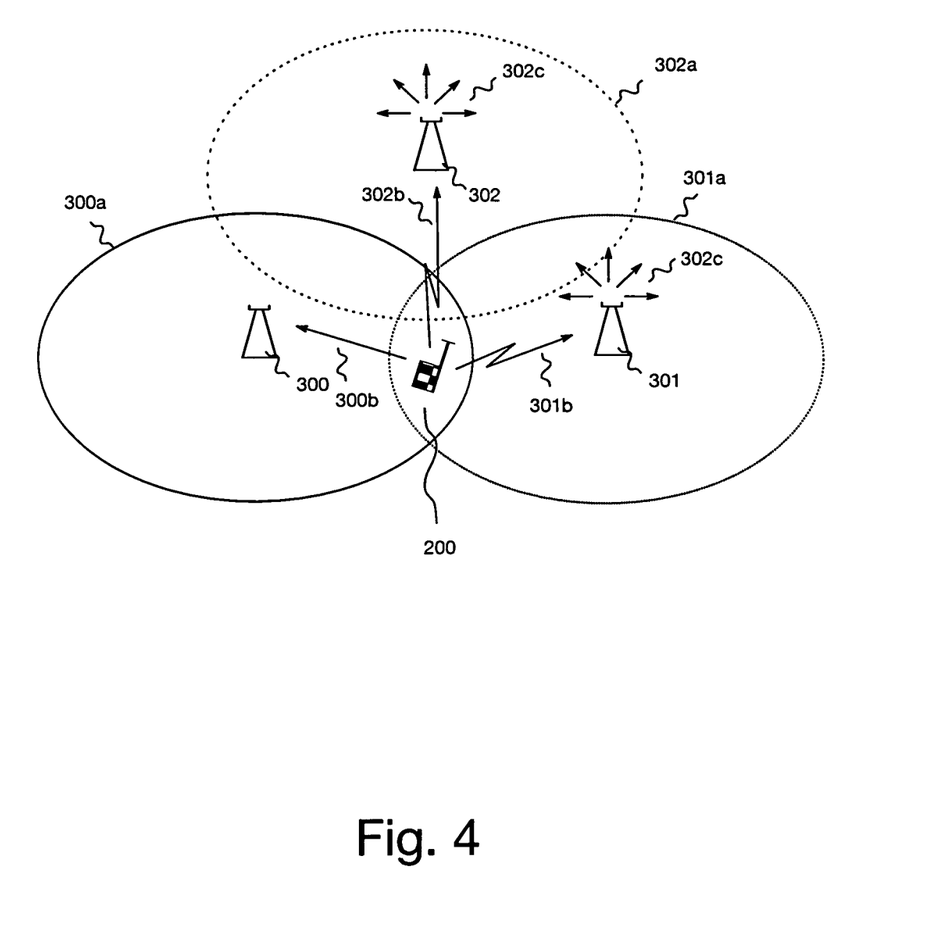
FIG. 4 illustrates a cellular mobile communication network with further embodiments.

FIG. 4 depicts a cellular mobile communication network with further embodiments. In FIG. 4 three base station transceivers 300, 301 and 302 are shown operating the respective cells 300a, 301a and 302a. FIG. 4 further illustrates the mobile transceiver or UE 200, which comprises the mobile transceiver apparatus 10, in the overlapping region between cells 300a and 301a. It is assumed that the UE 200 is attached to the first cell or NB 300, indicated by arrow 300b, while generating interference to the second cell NB 301 and the third cell NB 302, cf. arrows 301b and 302b. An embodiment of the above base station transceiver apparatus 20 is assumed to be comprised in the base station transceiver 300. The UE 200 will also listen to possible interference reduction information, e.g. E-RGCH-2 and E-RGCH-3 broadcast by the second cell or NB 301 and the third cell or NB 302, respectively. The broadcast of the interference reduction information is indicated by the arrows 301c and 302c in FIG. 4.

In this embodiment, the reduction criterion is such that the number of UEs in the overlap region that obey the inter-cell E-RGCHs is limited. In this way, only some of the UEs reduce their grants and do not cause a sharp degradation in cell edge throughput at the system level. In the following embodiment, the reduction criterion is such that the transmission power is reduced after reception of n subsequent requests, where n is an integer greater than one. The reduction criterion is for the UE 200 to obey every $n^{th}$ inter-cell E-RGCH command received. The value n can depend on a difference in the signal quality of a radio signal received from the first cell 300a at the mobile transceiver 200 and a radio signal received from the second cell 301a at the mobile transceiver 200.

In other words, the value of n depends on the difference in signal quality $\Delta S$ between the serving 300a and the neighbor cell 301a issuing the command. Since $\Delta S$ indicates the relative distance of the UE 200 to its neighbor cell 301, e.g. the CPICHs can be evaluated, the larger the value of $\Delta S$ the further away the UE 200 is from its neighbor cell 301a. Hence, the UE 200 can have a larger value of n and n may scale with the difference. The value n can also depend on the absolute signal strength or quality of the neighbor cell 301a issuing the command, since this indicates the absolute distance, rather than relative distance to serving cell.

The reduction criterion can be such that an offset value $n_{off}$ is considered, which is an integer value and which can, for example, be based on an identification number of the mobile transceiver 200. The transmission power of the mobile transceiver 200 is reduced when the sum of $n_{off}$ and the number of subsequent requests equals n or when ($n_{off}$+no. of subsequent requests) mod n=0. Advantageously, each UE 200 may have a different offset when it starts counting the value n. This is to avoid all UEs 200 with the same $\Delta S$, or roughly same path loss, from obeying the same E-RGCH. The offset can be randomized. For example, the offset $n_{off}$ is based on the UE IDentification (ID), e.g. the Enhanced-Radio Network Temporary Identity (E-RNTI).

Figure 5:
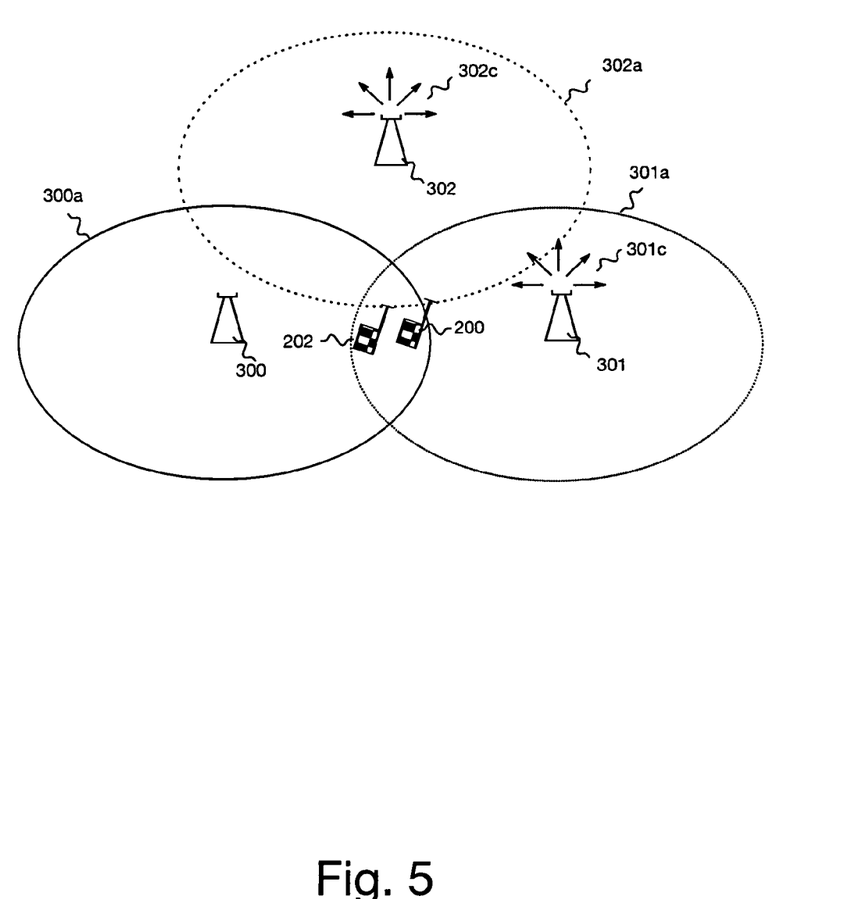
FIG. 5 illustrates a cellular mobile communication network with two mobile transceivers.

FIG. 5 illustrates a cellular mobile communication network with two mobile transceivers 200 and 202. FIG. 5 shows a similar network structure with the same network components as FIG. 4. The two UEs 200 and 202 are attached to NB 300a and are located in an overlapping coverage with two other (neighbor) cells, namely NB 301a and NB 302a as shown in FIG. 5. Both UEs 200 and 202 will obey every $n^{th}$ E-RGCH from each NB 301a, 302a, where n is based on the $\Delta S$ as in the following table:

TABLE 1

| $\Delta S$ and value n | |
|---|---|
| $\Delta S$ (dB) | n |
| >5 | ∞ |
| $4 < \Delta S \leq 5$ | 6 |
| $3 < \Delta S \leq 4$ | 5 |
| $2 < \Delta S \leq 3$ | 4 |
| $1 < \Delta S \leq 2$ | 3 |
| $0 < \Delta S \leq 1$ | 2 |
| $\leq 0$ | 1 |

It is to be noted, that $\Delta S$=Signal Strength of Serving Cell−Signal Strength of Neighbor Cell. The offset in which a UE 200, 202 will start obey its first E-RGCH at the $N_{offset}$ command can be calculated as:

$$N_{Offset} = (E\text{-RNTI MOD } 6) + 1.$$

The UEs 200 and 202 have the following E-RNTI, ΔS, value n and corresponding $N_{Offset}$:

TABLE 2

UE E-RNTI and Offset $N_{Offset}$

| UE | E-RNTI | ΔS | n | $N_{offset}$ |
|---|---|---|---|---|
| UE 200 | 8 | 3 | 4 | 3 |
| UE 202 | 126 | 1 | 2 | 1 |

Figure 6:
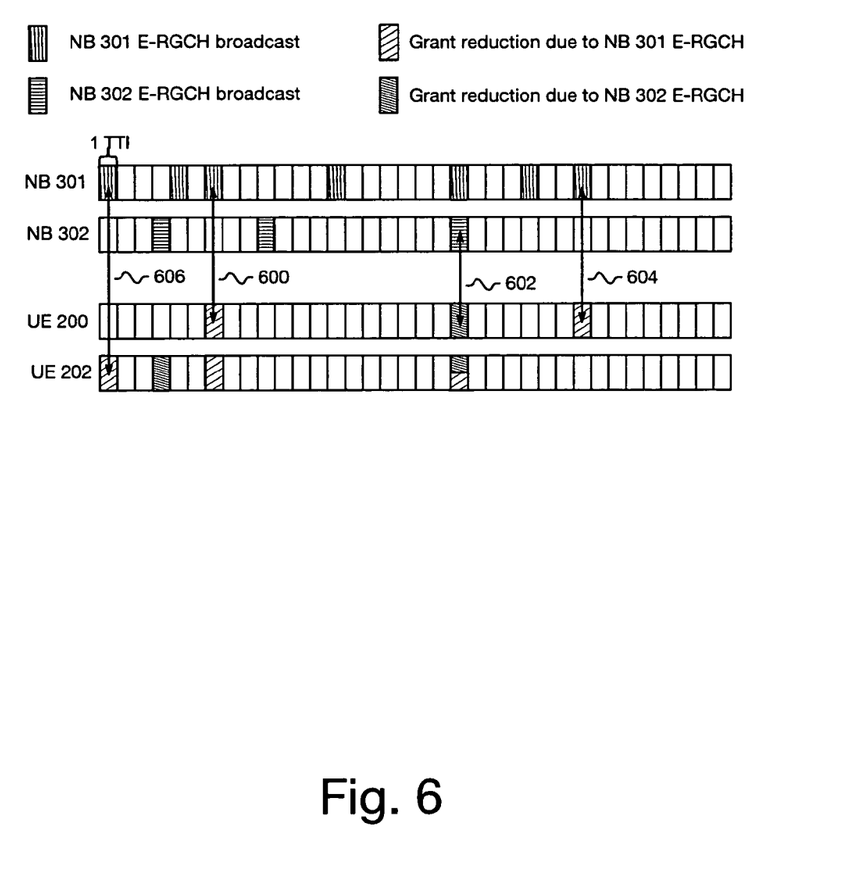
FIG. 6 illustrates viewgraphs of E-RGCH broadcasts and interference reduction in an embodiment.

FIG. 6 illustrates viewgraphs of E-RGCH broadcasts and interference reduction in an embodiment. FIG. 6 shows the E-RGCH broadcast from NB 301 and NB 302 and the corresponding grant reduction at UE 200 and UE 202 from FIG. 5. UE 200 will reduce its grant by 1 step for every 4 E-RGCHs received from the same NB. It starts its first reduction at an offset of $N_{offset}=3$ E-RGCH commands from each NB. UE's 200 first reduction comes from NB's 301 3rd E-RGCH as shown in FIG. 6 by the arrow 600. Its $2^{nd}$ grant reduction comes from the 3rd E-RGCH from NB 302, as indicated by arrow 602. After the $4^{th}$ E-RGCH from NB2, UE 200 reduces its grant again, as shown by arrow 604.

UE 202 reduces its grant by 1 step for every other E-RGCH received. It starts its reduction on the 1st reduction from the 1st E-RGCH of NB 301 since its $N_{Offset}=1$, as indicated by arrow 606 in FIG. 6. Similarly, it also performs a (2nd) reduction from the 1st E-RGCH from NB 302, where further arrows are omitted. Thereafter, the UE 202 performs a grant reduction for every other E-RGCH broadcast from each NB. Its $4^{th}$ reduction is due to command from NB 301 and NB 302. Here, the legacy procedure is followed, where the UE reduces its grant by ONE step if it receives one or more E-RGCH.

In another embodiment the reduction criterion is such that the transmission power of the mobile transceiver 200 is only reduced once in a predefined time period. In this embodiment, the UE 200 obeys an inter-cell E-RGCH command if the time between two grant reductions due to inter-cell E-RGCH is at least m Time Transmission Intervals (TTI). This is to avoid a UE 200 from continuously reducing its grants from E-RGCHs broadcast successively from different cells. The value m can be a function of the serving cell 300a signal quality, similarly to the value of n.

In a further embodiment, the two embodiments described above can be combined. Then if the UE 200 has not reduced its grant for a very long time, i.e. the time between two E-RGCH from the same neighbor is larger than value m, despite it has not receive n E-RGCH from a particular neighbor, it obeys the E-RGCH and reduces its grant. The reduction criterion is such that the transmission power is reduced if prior interference reduction information from the second cell 301a has been received more than a predefined time period ago. In a variant of this embodiment the transmission power is reduced after reception of n subsequent requests, where n is an integer greater than one.

In another embodiment, the mobile transceiver apparatus 10 comprises means for determining a probability value and further comprises means for generating a random or a pseudo random value. The reduction criterion is such that the transmission power is reduced based on a relation between the probability value and the random or pseudo random value. The means for determining is adapted to receive the probability value from the first cell 300a. The UE 200 then has a randomizing function, which generates the probability value $P_{E-RGCH}$ of obeying an inter-cell E-RGCH. Here, the UE 200 can generate a random number between 0 and 1 and if this number is lower or equals to $P_{E-RGCH}$, the UE 200 obeys the E-RGCH, otherwise it ignores it. The value $P_{E-RGCH}$ can be broadcast or signaled to the UE 200. The means for determining can be adapted to manipulate the probability value such that the transmission power is reduced more likely the longer the time since the last transmission power reduction. The value $P_{E-RGCH}$ can be fixed or changed based on the UE 200 conditions. For example, the UE 200 can receive an initial value of $P_{E-RGCH}$ and increase it if it has not reduced its grant due to an inter-cell E-RGCH for a long time.

Figure 7:
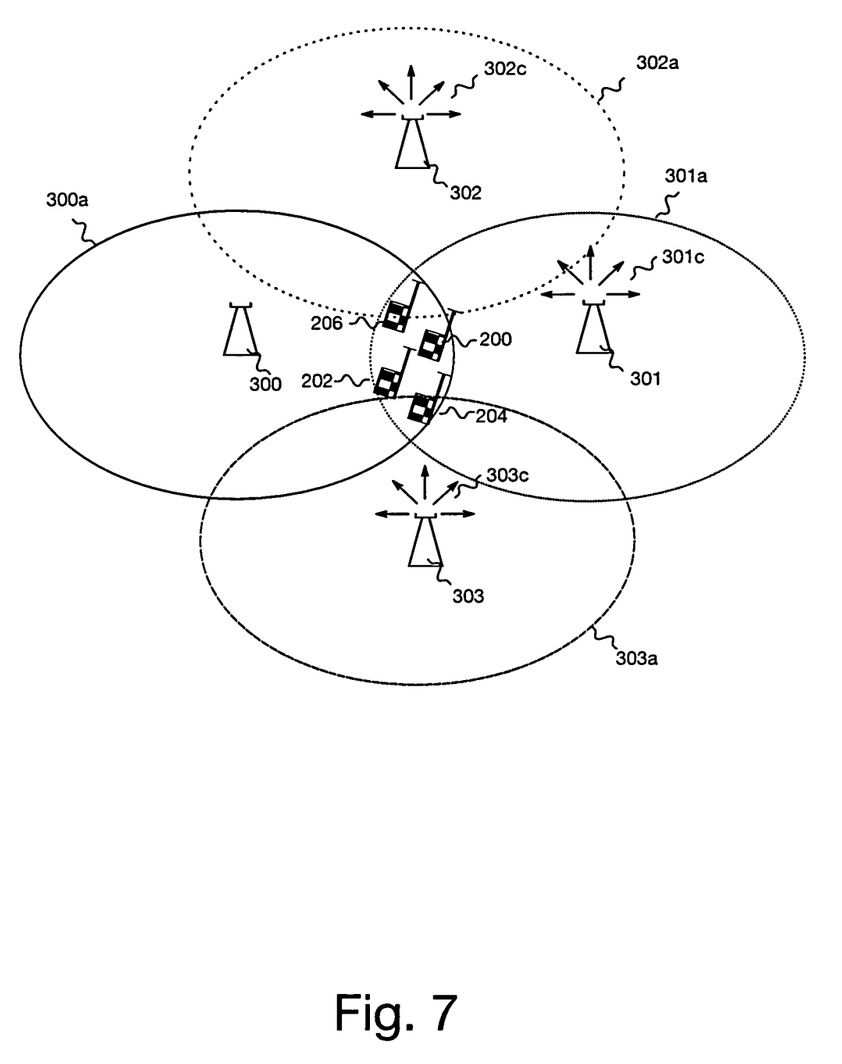
FIG. 7 illustrates a cellular mobile communication network with four mobile transceivers.

FIG. 7 illustrates a cellular mobile communication network with four mobile transceivers 200, 202, 204 and 206. FIG. 7 shows a similar network structure with the same network components as FIG. 4 and an additional base station transceiver or NB 303, with a coverage area 303a and E-RGCH broadcasting 303c. FIG. 7 shows 4 UEs 200, 202, 204 and 206, which all are connected to NB 300 and they are all in the overlapping coverage of NB 301, NB 302 and NB 303. NB 300 knows that there are 4 UEs connected to it in CELL_FACH. NB 300 therefore assigns a $P_{E-RGCH}=0.25$ to each UE 200, 202, 204 and 206.

It is now assume that at NB 301 interference, i.e., the Rise over Thermal (RoT) exceeds its threshold by 1 dB. Therefore, NB 301 wishes to reduce its interference by sending an inter-cell E-RGCH, i.e. E-RGCH 301c as shown in FIG. 7. All four UEs 200, 202, 204 and 206 receive the E-RGCH 301c and each of them generates a random number between 0 and 1 as in Table 3.

TABLE 3

UE determining whether to obey E-RGCH from NB3

| UE | $P_{E-RGCH}$ | Random Number | Obey E-RGCH from NB3 |
|---|---|---|---|
| UE 200 | 0.25 | 0.64 | No |
| UE 202 | 0.25 | 0.33 | No |
| UE 204 | 0.25 | 0.18 | Yes |
| UE 206 | 0.25 | 0.87 | No |

From Table 3, only UE 204 obeys the E-RGCH from NB 301. Here the UE 204 reduces its grant by 1 step, which is 1 dB in this example. It is assumed in this example the RoT of NB 301 reduces by 1 dB meeting its required threshold. In contrast to the embodiment a conventional method would cause all 4 UEs to reduce their grants. Although this would reduce the RoT at NB 301, it also significantly reduces the throughput at NB 300.

In yet another embodiment, the reduction criterion is such that the transmission power is reduced by less than a requested reduction amount. In this embodiment the UE 200 reduces its grant by only a part of the actual grant reduction commanded by the E-RGCH. The E-RGCH commands a reduction in the Serving Grant index. For example, if one step reduction in a Serving Grant index equals 5 dB, the UE 200 reduces only 2 dB. The reduction can depend on a reception quality of a radio signal of the second cell 301a received at the mobile transceiver 200 or on a difference in the signal quality of a radio signal received from the first cell 300a at the mobile transceiver 200 and a radio signal received from the second cell 301a at the mobile transceiver 200. The amount of reduction can be based on ΔS or the path loss of its neighbor cell 301a.

In a further embodiment, the means for controlling the transmission power is adapted to increase the transmission power or grant of the mobile transceiver 200 after a predefined time period has expired since the last transmission power or grant reduction. In this embodiment, the UE 200 can undo its grant reduction due to inter-cell E-RGCH after k TTI.

Figure 8:
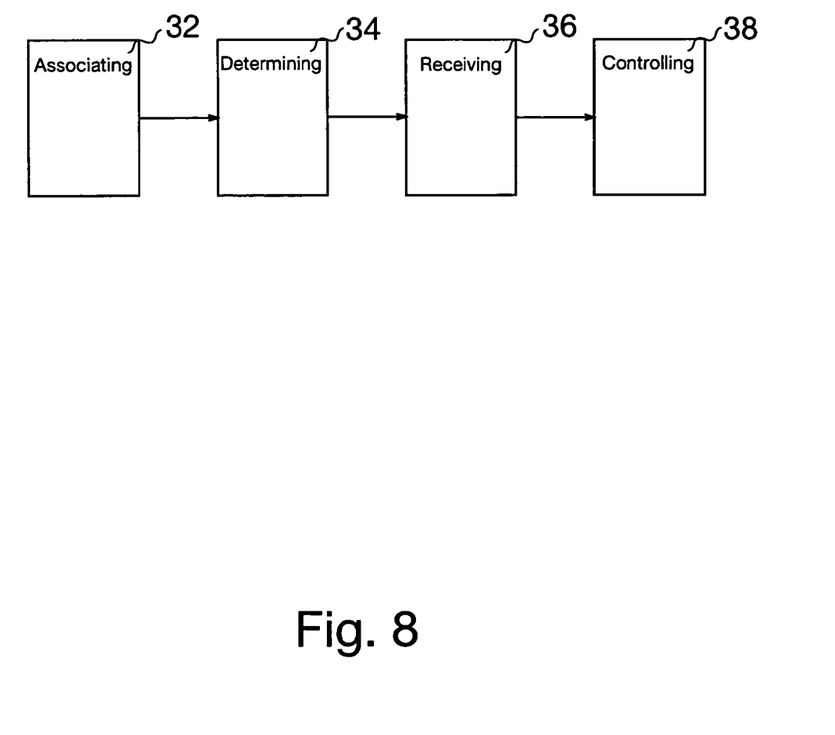
FIG. 8 shows a block diagram of an embodiment of a method for a mobile transceiver.

FIG. 8 shows a block diagram of an embodiment of a method for a mobile transceiver 200 in a cellular mobile communication network communicating with the mobile transceiver 200 using packet switched data. The mobile communication network comprises a plurality of base station transceivers 300, 301 and a base station transceiver 300, 301 operates one or more cells 300a, 301a. The method comprises a step of associating 32 with a first cell 300a, the first cell 300a receiving packet switched data from the mobile transceiver 200, and a step of determining 34 a reduction criterion. The method further comprises a step of receiving 36 interference reduction information from a second cell 301a, the interference reduction information comprising an indication on a request of the second cell 301a to reduce the transmission power and/or a grant of the mobile transceiver 200 to reduce the interference power received at the second cell 301a. The method further comprises a step of controlling 38 a transmission power of the mobile transceiver 200 based on the interference reduction information from the second cell 301a and based on a reduction criterion, the controlling being adapted to reduce the transmission power of the mobile transceiver 200 when the information on the interference reduction is received and the reduction criterion is fulfilled, the reduction criterion being such that the transmission power of the mobile transceiver 200 is reduced by less than requested by the interference reduction information.

Figure 9:
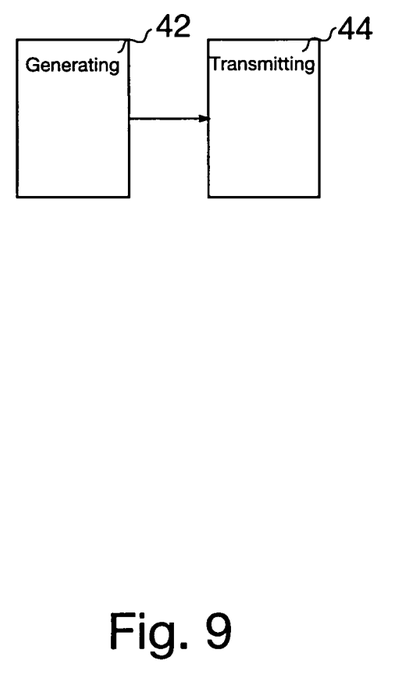
FIG. 9 shows a block diagram of an embodiment of a method for a base station transceiver.

FIG. 9 shows a block diagram of an embodiment of a method for a base station transceiver 300, 301 in a cellular mobile communication network communicating with a mobile transceiver 200. The base station transceiver 300, 301 operates one or more cells 300a, 301a, the mobile transceiver 200 being associated to one of the one or more cells 300a, 301a. The method comprises a step of generating 42 a reduction criterion for the mobile transceiver 200, the mobile transceiver 200 being adapted to control a transmission power and/or a grant of the mobile transceiver 200 based on an interference reduction information from a second cell 301a and based on the reduction criterion, the transmission power of the mobile transceiver 200 being reduced when the information on the interference reduction is received at the mobile transceiver 200 and the reduction criterion is fulfilled, the reduction criterion being such that the transmission power of the mobile transceiver 200 is reduced by less than requested by the interference reduction information from the second cell 301a. The method further comprises a step of transmitting 44 information on the reduction criterion to the mobile transceiver.

Embodiments may further provide a computer program having a program code for performing one of the above methods, when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for associating", "means for determining", "means for receiving", "means for controlling", "means for communicating", "means for generating", "means for transmitting", etc., may be provided through the use of dedicated hardware, such as "an associator", "a determiner", "a receiver", "a controller", "a generator", "a transmitter", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for a mobile transceiver in a cellular mobile communication network communicating with the mobile transceiver using packet switched data, the mobile communication network comprising a plurality of base station transceivers, a base station transceiver operating one or more cells, the apparatus comprising:

an associator configured to associate with a first cell, the first cell receiving packet switched data from the mobile transceiver;

a determiner configured to determine a reduction criterion;

a receiver configured to receive interference reduction information from a second cell, the interference reduction information comprising an indication on a request of the second cell to reduce the transmission power of the mobile transceiver, to reduce the interference power received at the second cell; and a controller configured to control a transmission power of the mobile transceiver based on the interference reduction information from the second cell and based on the reduction criterion, the controller being configured to reduce the transmission power of the mobile transceiver when the information on the interference reduction is received and the reduction criterion is fulfilled, the reduction criterion being such that the transmission power of the mobile transceiver is reduced by less than requested by the interference reduction information.

2. The apparatus of claim 1, wherein the reduction criterion is such that the transmission power is reduced after reception of n subsequent requests, where n is an integer greater than one and/or wherein n depends on a difference in the signal quality of a radio signal received from the first cell at the mobile transceiver and a radio signal received from the second cell at the mobile transceiver and/or wherein n scales with the difference.

3. The apparatus of claim 2, wherein the reduction criterion is such that an offset value $n_{off}$ is considered, which is an integer value and based on an identification number of the mobile transceiver, and wherein the transmission power of the mobile transceiver is reduced when the sum of $n_{off}$ and the number of subsequent requests equals n or when ($n_{off}$+number of subsequent requests) mod n=0 and/or wherein the reduction criterion is such that the transmission power of the mobile transceiver is only reduced once in a predefined time period.

4. The apparatus of claim 1, wherein the reduction criterion is such that the transmission power is reduced after reception of n subsequent requests, where n is an integer greater than one or the transmission power is reduced if prior interference reduction information from the second cell has been received more than a predefined time period ago.

5. The apparatus of claim 1, further comprising a probability value determiner configured to determine a probability value and further comprising a generator configured to generate a random or a pseudo random value, and wherein the reduction criterion is such that the transmission power is reduced based on a relation between the probability value and the random or pseudo random value.

6. The apparatus of claim 5, wherein the probability value determiner is configured to receive the probability value from the first cell.

7. The apparatus of claim 6, wherein the probability value determiner is configured to manipulate the probability value such that the transmission power is more likely to be reduced if a longer period of time passes since the last transmission power reduction than if a shorter period of time passes since the last transmission power reduction.

8. The apparatus of claim 1, wherein the reduction criterion is such that the transmission power is reduced by less than a requested reduction amount.

9. The apparatus of claim 1, wherein the reduction depends on a reception quality of a radio signal of the second cell received at the mobile transceiver or on a difference in the signal quality of a radio signal received from the first cell at the mobile transceiver and a radio signal received from the second cell at the mobile transceiver.

10. The apparatus of claim 1, wherein the controller is further configured to increase the transmission power of the mobile transceiver after a predefined time period has expired since the last transmission power reduction.

11. An apparatus for a base station transceiver in a cellular mobile communication network communicating with a mobile transceiver, the base station transceiver operating one or more cells, the mobile transceiver being associated to one of the one or more cells, the apparatus comprising:

a generator configured to generate a reduction criterion for the mobile transceiver, the mobile transceiver being configured to control a transmission power of the mobile transceiver based on interference reduction information from a second cell and based on the reduction criterion, the transmission power of the mobile transceiver being reduced when the information on the interference reduction is received at the mobile transceiver and the reduction criterion is fulfilled, the reduction criterion being such that the transmission power of the mobile transceiver is reduced by less than requested by the interference reduction information from the second cell; and a transmitter configured to transmit information on the reduction criterion to the mobile transceiver.

12. A mobile transceiver comprising the apparatus of claim 1.

13. A method for a mobile transceiver in a cellular mobile communication network communicating with the mobile transceiver using packet switched data, the mobile communication network comprising a plurality of base station transceivers, a base station transceiver operating one or more cells, the method comprising:

associating with a first cell, the first cell receiving packet switched data from the mobile transceiver;

determining a reduction criterion;

receiving interference reduction information from a second cell, the interference reduction information comprising an indication on a request of the second cell to reduce the transmission power of the mobile transceiver, to reduce the interference power received at the second cell; and controlling a transmission power of the mobile transceiver based on the interference reduction information from the second cell and based on a reduction criterion, the controlling being adapted to reduce the transmission power of the mobile transceiver when the information on the interference reduction is received and the reduction criterion is fulfilled, the reduction criterion being such that the transmission power of the mobile transceiver is reduced by less than requested by the interference reduction information.

14. A method for a base station transceiver in a cellular mobile communication network communicating with a mobile transceiver, the base station transceiver operating one or more cells, the mobile transceiver being associated to one of the one or more cells, the method comprising:

generating a reduction criterion for the mobile transceiver, the mobile transceiver being configured to control a transmission power of the mobile transceiver based on an interference reduction information from a second cell and based on the reduction criterion, the transmission power of the mobile transceiver being reduced when the information on the interference reduction is received at the mobile transceiver and the reduction criterion is fulfilled, the reduction criterion being such that the transmission power of the mobile transceiver is reduced by less than requested by the interference reduction information from the second cell; and transmitting information on the reduction criterion to the mobile transceiver.

15. A non-transitory computer readable medium comprising a computer program having a program code for performing the method of claim 13, when the computer program is executed on a computer or processor.

* * * * *